United States Patent [19]

Madsen

[11] Patent Number: 4,763,377
[45] Date of Patent: Aug. 16, 1988

[54] SWIVELING SCRUB BRUSH

[75] Inventor: Everett Madsen, Fridley, Minn.

[73] Assignee: Flo-Pac Corporation, Minneapolis, Minn.

[21] Appl. No.: 921,912

[22] Filed: Oct. 21, 1986

[51] Int. Cl.⁴ ............................ B25G 3/20; F16D 3/28
[52] U.S. Cl. .................................... 15/144 A; 15/172; 403/58; 403/74
[58] Field of Search ................ 15/144 A, 144 R, 172, 15/146, 147 R, 147 A, 228, 229 B, 229 BP; 403/57, 58, 74

[56] References Cited

U.S. PATENT DOCUMENTS

| 2,407,421 | 9/1946 | Herold | 15/144 A |
| 2,763,517 | 9/1956 | Strand | 15/144 A X |
| 3,760,450 | 9/1973 | Griffin et al. | 15/229 B |
| 3,850,533 | 11/1974 | Thielen | 403/58 |
| 4,648,738 | 3/1987 | Thielen | 15/144 A X |
| 4,663,796 | 5/1987 | Helling et al. | 15/144 A |

Primary Examiner—Peter Feldman
Attorney, Agent, or Firm—James R. Haller

[57] ABSTRACT

A swiveling, position-maintaining scrubbing brush is provided with a pivot body joined to a handle and having pivot members engaging bosses on the brush body. Means, exemplified by a wedge received in a cut in the body, are provided to spread apart the pivot members and to thus adjust the resistance to swivel movement of the brush body.

8 Claims, 2 Drawing Sheets

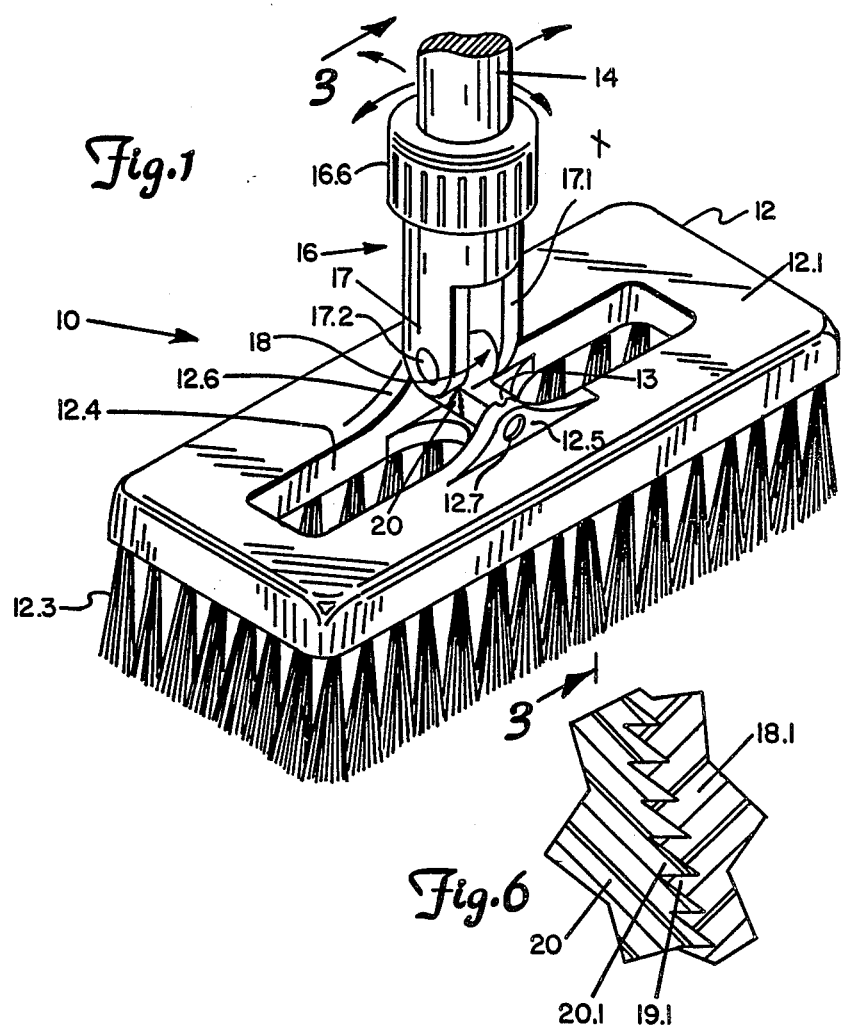
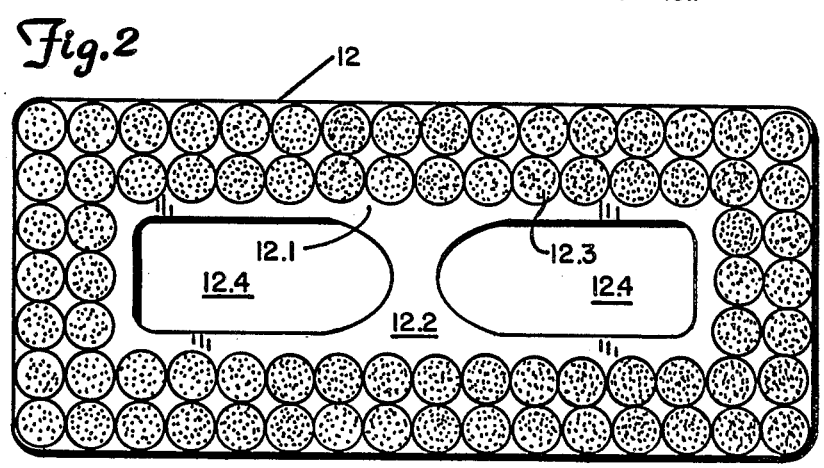

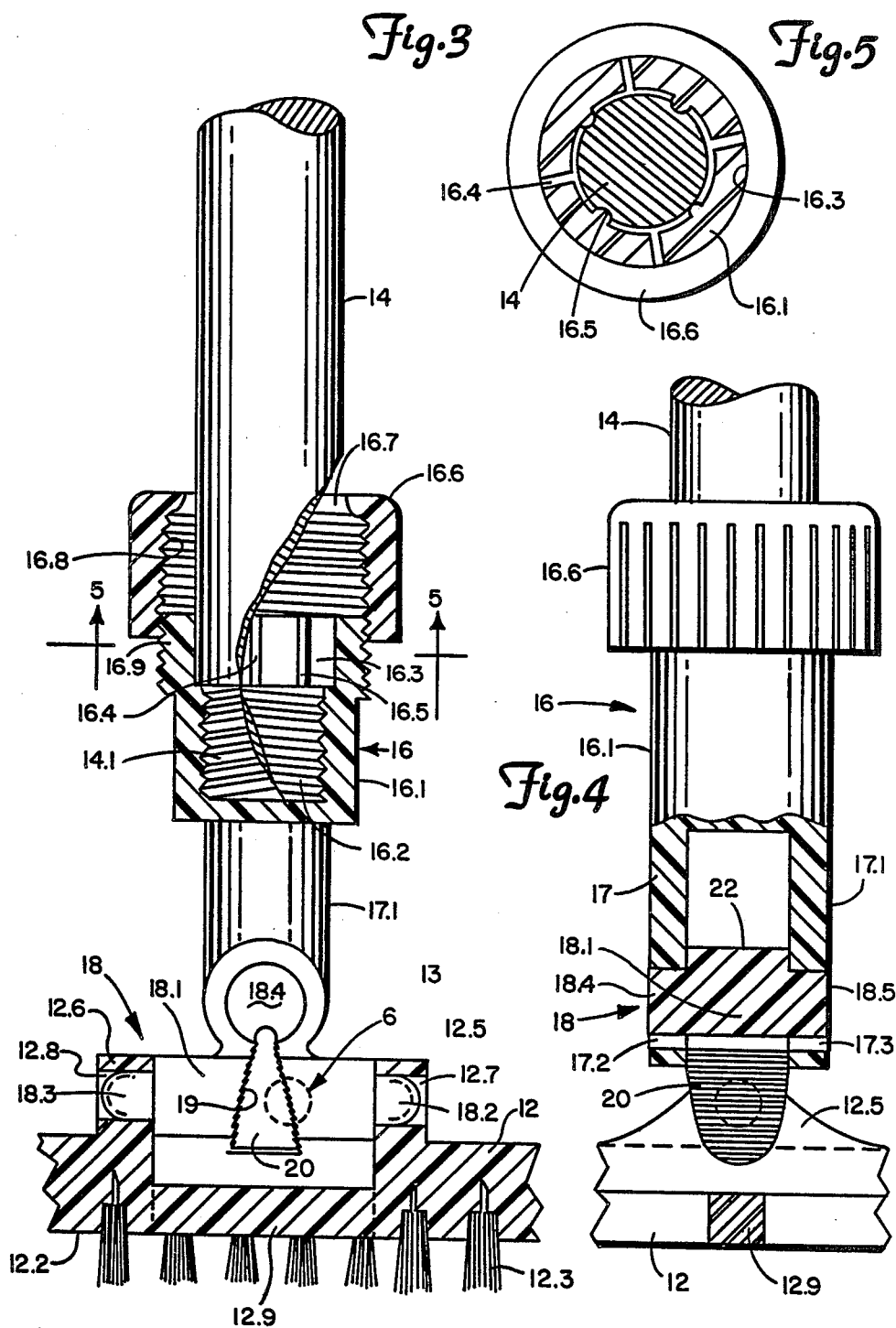

SWIVELING SCRUB BRUSH

FIELD OF THE INVENTION

The invention relates to hand-operable brushes in which the brush head can be swiveled to a desired orientation.

BACKGROUND OF THE INVENTION

Various scrubbing devices have been commercially employed to enable floors and wallboards to be scrubbed. One such device, sold by Minnesota Mining and Manufacturing Company under its registered trademark "Doodlebug", comprises a flat plate to receive and support a scouring pad, and a handle pivotally attached to the plate, the pivotal connection being such as to permit the light-weight plate and scouring pad to be retained in a desired orientation with respect to the handle.

Floor brushes have routinely been provided with rigid, angled connections between the handle and brush body. Brush bodies in general are often rather heavy. A brush body commonly comprises a brush block that has a handle connection on its upper surface and bristles extending from its lower surface to form a brush face, the brush block commonly being made of wood or plastic. Because of the weight of the brush blocks, it has been found difficult to attach them by means of operable swivel connectors to an elongated handle. As on the "Doodlebug" scouring tool described above, it would be desirable to provide a scrubbing brush with a swivel attachment to its handle in such a manner that the comparatively heavy brush block could be oriented as desired with respect to the handle throuqh the swivel connector, and that the resistance to swivel movement provided by the connector would be such as to retain the brush block in its desired position against the force of gravity as the handle is manipulated by an operator in a cleaning operation. On the other hand, the swivel connection should be sufficiently movable so that the swivel position of the brush block with respect to the handle may be changed by grasping the handle and gently pressing the brush body with manual force against a solid surface such as a floor or wallboard so that the brush block swivels to orient the brush face in surface-to-surface contact with the surface to be cleaned.

SUMMARY OF THE INVENTION

The present invention provides a swiveling, position-maintaining scrubbing brush in which the resistance to swiveling movement of the brush can be adjusted. The scrubbing brush comprises a brush block having a bristle-bearing lower surface and an upper surface which bears spaced-apart bosses. A handle connector is provided to receive an elongated handle of wood or the like. Pivot means are joined to the handle connector, the pivot means comprising a body including a pair of pivot members which pivotally engage the respective bosses of the brush block to allow pivoting about an axis against a resistance. The pivot means is characterized by including means for adjusting the resistance (commonly due to friction) between the brush block bosses and the pivot body.

In another embodiment, the scrubbing brush of the invention comprises a brush block having a bristle-bearing lower surface and an upper surface having spaced-apart bosses, the handle connector in this embodiment having means for receiving an elongated handle and including a pair of spaced-apart bosses. Pivot means are provided comprising a body having first pair of pivot members pivotally engaging the respective bosses of the brush block to allow pivoting about a first axis against a first resistance, and a second pair of pivot members pivotally engaging the respective bosses of the handle connector to allow pivoting about a second axis against a second resistance. The second axis lies in a plane that is normal to a plane within which lies the first axis. Adjustment means are provided for adjusting the first resistance, or the second resistance, or both.

The adjustment means employed in the invention preferably includes means for varying the distance between the members of a pair of pivot members parallel to their pivot axis, thereby adjusting the force with which the pivot members engage the respective bosses. The adjustment means preferably comprises a wedge-shaped insert that is received within a cut formed in the pivot means between respective pivot members so that as the insert is forced into the cut, the pivot members are spread apart into more forceful contact with the respective bosses.

DESCRIPTION OF THE DRAWING

FIG. 1 is a broken-away, perspective view of a scrubbing brush of the invention;

FIG. 2 is a bottom view of the scrubbing brush of FIG. 1;

FIG. 3 is a broken-away end view, in partial cross section, of the scrubbing brush of FIG. 1 taken generally along Line 3—3 of FIG. 1;

FIG. 4 is a broken-away side view, in partial cross section, of the scrubbing brush of FIG. 1;

FIG. 5 is a cross sectional view taken along Line 5—5 of FIG. 3; and

FIG. 6 is an enlarged view showing in detail a portion of device shown at 6 in FIG. 3.

DETAILED DESCRIPTION OF THE PREFERRED EMBODIMENTS

Referring first to FIGS. 1, 3 and 5, there is shown a scrubbing brush 10 comprising a brush body 12, an elongated handle 14, a handle connector shown generally as 16, and a pivot member shown generally at 18.

The brush block 12 comprises a generally rectangular plate 12.1 having a generally flat lower surface 12.2 provided with tufts 12.3 of bristles. As shown in FIG. 3, the bottom surface 12.1 of the brush body may be provided with shallow bores within which are received bent-over tufts of bristles, the latter being retained in the bores by means of staples. The brush block desirably has one or more fairly large openings shown at 12.4 for the purpose of reducing the weight of the brush block and so as to provide internal bristle-free areas in the brush face into which adjacent bristles may bend during a scrubbing operation. At its upper surface, the brush body contains a pair of spaced, upwardly extending bosses 12.5, 12.6, each having a hole 12.7, 12.8, respectively, therethrough, the holes being coaxial. The brush block openings 12.4 may be thought of as a single opening, the side walls of which are bridged by means of a central web 12.9 (FIGS. 3 and 4).

The handle connector 16 may be adapted, as depicted, to receive common broom or brush handles 14. The connector includes a body portion 16.1 which has an internally threaded cylindrical recess 16.2 and an upwardly open cylindrical recess 16.3. The lower, threaded end 14.1 of a brush handle 14 is received in the threaded recess 16.2 of the connector, as shown in FIG. 3. The upwardly open recess 16.3 of the connector is provided with vertical slots 16.4 enabling the walls of this portion of the connector to bend slightly inwardly and outwardly, and also is provided with a series of inwardly protruding ribs 16.5 to rigidly grip the surface of a brush handle 14. An internally threaded cap 16.6 is provided with a central, axial opening 16.7 through which the brush handle 14 extends, the threads 16.8 converging upwardly in pipe thread fashion so that as the cap is threaded downwardly upon the external threads 16.9, the slotted walls of the upwardly open recess 16.3 are forced inwardly into secure contact with the handle 14.

The connector 16 has a pair of downwardly extending arms 17, 17.1 having holes therein, 17.2, 17.3 respectively, the holes being generally coaxial.

Pivot means, designated generally as 18, comprises a body 18.1 having a first pair of pivot pins 18.2, 18.3 receivable respectively in holes 12.7, 12.8 in the brush block bosses. Boss 12.5, as shown best in FIGS. 1 and 3, has a vertically extending groove 13 to aid in the insertion of the pivot pin 18.2. The body includes a second pair of pivot pins designated 18.4, 18.5 which extend along an axis lying in a plane perpendicular to a plane within which lies the axis defined by the pivot pins 18.2, 18.3. The pivot pins 18.4, 18.5 are received, respectively, in the holes 17.2, 17.3 of the handle connector.

It will be understood that the ease with which the handle connector 16 may be pivoted with respect to the pivot means 18 will depend largely upon the frictional forces between contacting portions of the pivot means 18 and the handle connector. The arms 17, 17.1 commonly are formed so that they tend to converge inwardly at their lower ends and thus grip with reasonable force the pivot pins 18.4, 18.5 and associated structure of the pivot body. In similar fashion, the friction between the pivot pins 18.2, 18.3 and the associated structure of the bosses 12.5, 12.6 determine the ease with which the pivot means 18 can pivot with respect to the brush block 12. The frictional forces can be increased (and hence the resistance to pivoting increased) by increasing the axial force between the pivot body and the bosses.

Referring to FIG. 3, the pivot body 18.1 is shown as having a wedge-shaped cut 19 therein, the cut having faces converging upwardly and being provided with teeth 19.1 (FIG. 6). A wedge-shaped insert, designated 20, is similarly provided with teeth 20.1 and is receivable within the wedge-shaped cut 19. The teeth of the insert and of the cut cooperate as shown in FIG. 6 to enable the insert to be easily advanced into the cut but to restrain withdrawal of the insert from the cut. That is, the respective teeth may have mating surfaces which meet along planes that are substantially perpendicular to the direction of movement of the insert 20 as it is inserted in the wedge-shaped cut and which are located as to prevent removal of the insert. It will be understood that, as the wedge is driven into the cut, the ends of the body 18.1 which bear the pivot pins 18.2, 18.3 are spread apart and come into more forceful contact with the associated structure of the bosses 12.5, 12.6, thereby increasing the resistance to pivoting movement between the pivot means 18 and the brush block 12.

If desired, a similar wedge-shaped cut can be formed in the upper portion of the pivot body, as located by the number 22 in FIG. 4, to spread the ends of that member bearing the pivot pins 18.4, 18.5 and bringing the same into more forceful contact with the associated structure of the handle connector. It has been found that the arms 17, 17.1 of the handle connector are sufficiently long as to enable the ends of the arms to be spread apart to receive the pivot pins 18.4, 18.5, and to then spring back together to grip the pivot pins with some force, and, in a preferred embodiment, a resistance adjustment such as the wedge and wedge-shaped cut is not required at position 22 in FIG. 4.

The wedge-shaped cut 19, of course, may be of any mechanical acceptable shape, and it may be desired to hold the wedge in place by means of pins or the like rather than toothed engagement with the pivot body 18.1.

While a preferred embodiment of the present invention has been described, it should be understood that various changes, adaptations and modifications may be made therein without departing from the spirit of the invention and the scope of the appended claims.

What is claimed is:

1. A swiveling, position-maintaining scrubbing brush comprising:
    a brush block having a
    bristle-bearing lower surface and an upper surface bearing spaced-apart bosses;
    a handle connector having means for receiving an elongated handle and including a pair of spaced-apart bosses;
    pivot means comprising a body having a first pair of pivot members pivotally engaging the respective bosses of the brush block to allow pivoting about a first axis against a first resistance and a second pair of pivot members pivotally engaging the respective bosses of the handle connector to allow pivoting about a second axis against a second resistance, the second axis lying in a plane perpendicular to a plane within which lies the first axis, and said first and second resistance being sufficient to enable the brush body to resist gravitational forces and to remain in a given orientation with respect to the handle connector; and
    adjustment means for adjusting the first resistance or the second resistance or both, said adjustment comprising a cut extending into the body between a pair of pivot members, and a wedge-shaped insert received within the cut and operable, when forced into the cut, to spread apart said pivot members.

2. The scrubbing brush of claim 1 wherein the bosses of each pair of bosses have coaxial holes and wherein the pivot means comprises a body having a first pair of pivot pins extending oppositely therefrom along the first axis and received pivotally within the holes in the brush block bosses, and another pair of pins extending oppositely from the body along the second pivot axis and pivotally received in the holes of the handle connector bosses.

3. The scrubbing brush of claim 1 wherein the cut and the wedge-shaped insert have cooperating, engaging teeth, enabling the insert to be forced into the cut but restraining the insert from being removed from the cut.

4. The scrubbing brush of claim 3 wherein the bosses of the handle connector at least partially overlay ends of the wedge-shaped insert to prevent sideways escape thereof from the cut.

5. A swiveling, position-maintaining scrubbing brush comprising:

a brush block having a bristle-bearing lower surface and an upper surface having spaced-apart bosses having coaxial holes;

a handle connector having means for receiving an elongated handle;

pivot means joined to the handle and comprising a body having a pair of pivot pins extending oppositely therefrom along the pivot axis for pivotal receipt in the holes of the bosses to allow pivoting about an axis against resistance caused by friction between the pivot members and bosses; and adjustment means for adjusting said resistance, comprising a wedge-shaped cut extending into the body between the pivot pins and a wedge-shaped insert received therewith and operable, when forced into the wedge-shaped cut, to axially spread apart said pivot pins.

6. The scrubbing brush of claim 5 wherein said wedge-shaped insert and wedge-shaped cut have cooperating teeth enabling the insert to be forced into the cut but preventing the insert from being withdrawn from the cut.

7. The scrubbing brush of claim 6 wherein bosses of the handle connector at least partially overlay ends of the wedge-shaped insert to prevent sideways escape thereof from the wedge-shaped cut.

8. A swiveling, position-maintaining scrubbing brush comprising a brush block having a bristle-bearing lower surface and an upper surface, the handle connector having means for receiving an elongated handle, and pivot means pivotally attached to the brush block and handle connector to form a pivotal attachment therewith, said pivotal attachment comprising a pair of bosses and a pair of pivot members pivotally engaging the bosses to allow pivoting about an axis against a resistance, and adjustment for adjusting the resistance comprising a cut extending between the pivot members, and a wedge-shaped insert received within the cut and operable, when forced into the cut, to spread apart the pivot members.

* * * * *